United States Patent [19]
Kahle

[11] Patent Number: 6,074,031
[45] Date of Patent: *Jun. 13, 2000

[54] METHOD AND APPARATUS FOR PRINTING LABELS ON DIGITAL RECORDING MEDIA

[75] Inventor: Rolf D. Kahle, Saratoga, Calif.

[73] Assignee: Compulog Corporation, Saratogo, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/988,843

[22] Filed: Dec. 11, 1997

[51] Int. Cl.⁷ ..................................................... B41J 3/00
[52] U.S. Cl. .................................. 347/4; 347/2; 101/38.1
[58] Field of Search .............................. 347/2, 4, 9, 105, 347/16; 400/320, 320.1, 323; 101/38.1

[56] References Cited

U.S. PATENT DOCUMENTS

| | | | |
|---|---|---|---|
| 4,006,463 | 2/1977 | Hanks | 341/90 |
| 4,562,489 | 12/1985 | Gaskell et al. | 360/39 |
| 4,811,325 | 3/1989 | Sharples, Jr. et al. | 369/85 |
| 4,866,462 | 9/1989 | Watanabe | 347/9 |
| 4,867,582 | 9/1989 | Ishigami | 400/70 |
| 4,954,968 | 9/1990 | Yamaguchi et al. | 395/112 |
| 4,989,181 | 1/1991 | Harada | 365/200 |
| 5,018,884 | 5/1991 | Hirano et al. | 400/126 |
| 5,019,846 | 5/1991 | Goto et al. | 386/284 |
| 5,023,728 | 6/1991 | Nimura et al. | 358/437 |
| 5,033,038 | 7/1991 | Kobayashi et al. | 369/36 |
| 5,036,503 | 7/1991 | Tomita | 369/36 |
| 5,056,073 | 10/1991 | Fitzgerald et al. | 369/36 |
| 5,093,750 | 3/1992 | Park et al. | 386/98 |
| 5,099,465 | 3/1992 | Geiger et al. | 369/36 |
| 5,101,388 | 3/1992 | Fushimi | 369/36 |
| 5,136,562 | 8/1992 | Staar | 369/36 |
| 5,148,403 | 9/1992 | Gardner | 366/15 |
| 5,161,233 | 11/1992 | Matsuo et al. | 399/136 |
| 5,317,337 | 5/1994 | Ewaldt | 347/2 |
| 5,423,619 | 6/1995 | Kohno | 400/525 |
| 5,518,325 | 5/1996 | Kahle | 400/70 |
| 5,521,674 | 5/1996 | Guillory et al. | 347/16 |
| 5,595,389 | 1/1997 | Parulski et al. | 463/31 |
| 5,825,381 | 10/1998 | Choo | 347/37 |

Primary Examiner—John Barlow
Assistant Examiner—J. D. Stephens
Attorney, Agent, or Firm—Townsend and Townsend and Crew LLP

[57] ABSTRACT

The invention provides an exemplary label printer and methods for printing labels on optical media. According to one exemplary method, an optical medium is inserted into a printing device having a mechanism for rotating the optical medium. The optical medium is rotated with a rotation mechanism. Further, a print head is moved over the optical medium and ink is ejected onto the medium while the medium is rotating to create a label on the medium.

17 Claims, 4 Drawing Sheets

METHOD AND APPARATUS FOR PRINTING LABELS ON DIGITAL RECORDING MEDIA

BACKGROUND OF THE INVENTION

The invention relates generally to the field of labeling, and in particular to the placement of visual labels on optical media, such as compact disks and digital video disks. In one particular embodiment, the invention provides systems and methods for printing a label on the medium while the medium is rotating.

Optical disks, such as compact disks and digital video disks, or digital versatile disks, have recently become a popular form of media for storing digital information. With advances in technology, it is now possible not only to read information from such optical media, but also to record digital information directly onto the media. For example, recordable compact disks (referred to as CD-Rs) may have digital information recorded on them by placing the CD-R into a compact disk recorder that receives the digital information from a computer. Such forms of optical media are thus particularly useful for data distribution and/or archiving.

When using the CD-R or other optical disks for data distribution and/or archiving, it is important to properly label the disks. Because the CD-R is not mass produced, it is not cost effective to silkscreen a label on the disk as is the current method with the CD ROM. Instead, present methods for labeling the CD-R include manually writing identification information on a label and attaching the label to the disk, or by taking a felt tip pen or marker and writing identification information on the surface of the disk itself. However, such techniques are time consuming and error-prone.

Hence, it would be desirable to provide systems and methods for printing labels directly on optical media in an efficient manner. For example, it would be desirable to provide a printer that could be integrated into a recorder or otherwise associated with a recording system so that labels could be printed on the recording medium at or near the time when the digital information is recorded onto the medium. It would further be desirable if such systems and methods were conducive to printing multiple labels on an optical medium at different print sessions, such as when archiving data from a computer.

SUMMARY OF THE INVENTION

The invention provides exemplary systems and methods for printing labels on optical media. According to one exemplary method, an optical medium is inserted into a printing device having a mechanism for rotating the optical medium. A print head is positioned over the medium and ink is ejected onto the medium while the medium is rotating to create a label on the medium. In this way, a label may be placed on the optical medium while the medium is within a recording device. Alternatively, the print head may be included in a stand-alone print mechanism to allow the label to be created before or after a recording session.

The optical medium will preferably be circular in geometry and may be any one of a variety of optical media, including compact disks, CD-Rs, CD-RWs, digital video disks or digital versatile disks, and the like, as well as any future implementations of optical media. In one particular aspect, the print head is mounted above the rotating medium on a linear track. In this way, the print head may be translated along the track to move the print head over the medium. By translating the print head in this manner, different locations on the medium may be printed with the print head. Alternatively, the print head may be configured to have a sufficient number of jets to print the entire printable area on the medium (in a radial direction) without requiring translation of the print head.

In another aspect of the method, the label is produced from label information that is initially created in an x,y coordinate format. The label information is translated from this format to a polar coordinate format prior to ejecting the ink onto the medium. The ink ejected onto the rotating medium is preferably distributed in distinct dots. The number of dots printed on the medium is preferably equal in number to the number of dots in the x, y coordinate format. In this way, the halftone image representation of the label is preserved during the translation into polar coordinates.

In still another aspect, the method provides for printing a circular label in a manner such that the ends of the label abut each other at approximately the same location. To abut the ends in this manner, the rate of rotation of the optical medium is measured, and the optical medium is partitioned into print sectors. The ink is then ejected during time periods that are equal to the number of sectors divided by the time required to rotate the optical medium one revolution. In this way, each time the ink is ejected an adjacent sector is printed. Preferably, the rate of rotation is measured by sensing a marker on the optical medium during rotation of the optical medium and counting the number of clock pulses produced when rotating the optical medium one revolution. In one particular aspect, the marker is produced on the optical medium by ejecting ink from the print head.

Use of a marker on the optical medium is further advantageous in that it may be used to rotationally align a second label with the first label. More specifically, since the location of the first label relative to the marker will be known, the second label may be printed in alignment with the first label after sensing the location of the marker.

In still another aspect, multiple labels which are created at different print sessions may be radially positioned relative to each other by sensing features on the medium, such as the outer periphery, and radially positioning the labels relative to the outer periphery. For example, the location of the print head relative to the outer periphery of the medium may be sensed by sensing a flag on the print head with a sensor whose location is known relative to the outer periphery. Preferably, the first label will be printed beginning at an initial printing position which is at a location where the sensor initially senses the flag as it is translated along the track. Hence, when ready to print a second label, the radial position of the second label may be determined based on how far the first label was printed relative to the initial printing position.

In another exemplary method of the invention, the label is printed on an optical medium by inserting the optical medium into a reading or recording device which reads data from or records data onto the medium as the medium rotates. While within the reading or recording device, the medium is rotated and a print head is moved over the medium. Ink is then ejected onto the medium while the medium is rotating to create the label on the medium. In this way, a label may be placed on the medium while within a reading or recording device, such as a compact disk recorder.

In a preferable aspect, the print head is mounted above the rotating medium on a linear track so that the print head may be translated along the track to move the print head over the medium. In another aspect, the print head is moved by a motor which is separate from the motor employed to spin the optical medium while reading or recording digital information. The print head is operably connected to a controller having label information, and the controller sends a signal to the motor to move the print head and to deliver the label information to the print head so that ink may be ejected onto the medium. In still another aspect, the printed label may be produced from black ink or from a variety of colors.

The invention further provides an exemplary label printing system for optical media. The system comprises a print head and a track which is adapted to position the print head above the rotating optical medium. A controller is provided to send signals to move the print head along the track and to eject ink from the print head onto the medium while the medium is rotating to produce a label on the medium.

In one aspect, a housing is provided for receiving the print head and the track. The housing may be operably attached to the housing of a recording device so as to produce an integrated printing and recording system. Alternatively, the housing may be configured as a stand-alone printing device.

In another aspect, a rotation mechanism is provided to rotate the optical medium. The rotation mechanism will preferably be different from the motor typically used to spin a compact disk in a CD player or recorder. However, in some cases, the motor used to spin the disk when performing read and/or write operations may also be used to rotate the medium during printing operations. In one exemplary aspect, the rotation mechanism comprises a motor that is coupled to a capstan. In this way, the capstan may be placed against an outer rim of the optical medium to rotate the optical medium.

In yet another aspect, a mounting bracket is provided which is pivotally attached to the housing. In this way, the mounting bracket may be pivoted to move the rotation mechanism into and out of engagement with the optical medium. In one particular aspect, a lever is operably attached to the mounting bracket such that movement of the print head from a home position toward a printing position releases the lever to allow the capstan to move into engagement with the optical medium. A spring or other biasing member is preferably operably attached to the housing and to the mounting bracket so that the spring will pivot the capstan against the optical medium when the print head is moved to release the lever.

In yet another aspect, a position mark sensor is operably attached to the mounting bracket and is employed to detect a position mark on the optical medium as the optical medium rotates. As previously described, the position mark on the optical medium may be sensed both to determine the rate of rotation of the optical medium and to serve as a reference point so that multiple labels may be properly rotationally positioned relative to each other during multiple print sessions.

In yet another aspect, a print head sensor is operably attached to the mounting bracket to determine the location of the print head relative to the optical medium. Conveniently, a flag may be attached to the print head so that as the print head is translated along the track, the flag will be sensed by the print head sensor. Preferably, the print head sensor will be attached to the mounting bracket at a location where, when the capstan engages the outer periphery of the medium, and when sensor senses the flag, the print head will be at an initial printing position. In this way, the location of the print head relative to the outer periphery of the medium will be known when the print head is at the initial printing position.

In yet another aspect, the controller will be configured to count the number of clock pulses produced by the motor when rotating the optical medium. Based on the number of clock pulses produced during one rotation, the controller may be configured to eject ink at specified sectors on the medium so that the label will not overlap itself during printing.

DETAILED DESCRIPTION OF THE SPECIFIC EMBODIMENTS

The invention provides exemplary systems and methods for printing labels on optical media, such as compact disks, CD-Rs, CD-RWs, digital video disks or digital versatile disks, and the like, as well as any future implementations of optical media. Such labels are preferably created by ejecting ink onto the recording medium as described generally in U.S. Pat. No. 5,518,325, the disclosure of which is herein incorporated by reference. One important feature of the invention is that the label is placed on the optical medium while the optical medium is rotating. Further, the print head is preferably aligned with a radial axis of the optical medium so that radial lines or print sectors are printed each time ink is ejected from the print head. In this way, as the optical medium rotates, successive print sectors are created, and as the optical medium completes one revolution, a complete label is placed on the optical medium.

The print heads of the invention may be configured to move in the radial direction so that an entire printable area on the optical medium may be printed by radially moving the print head to different radial locations during successive revolutions of the optical medium. Alternatively, the print head may be configured to be large enough to span the entire printable area on the optical medium so that it will not be necessary to radially translate the print head during the printing session.

Another important feature of the invention is that the labeling system may be configured to be a stand-alone printer or may be integrated into a reading and recording device. In this way, labels may be printed either while the optical medium is within a reading or recording device or while within in a stand-alone printer.

Figure 1:
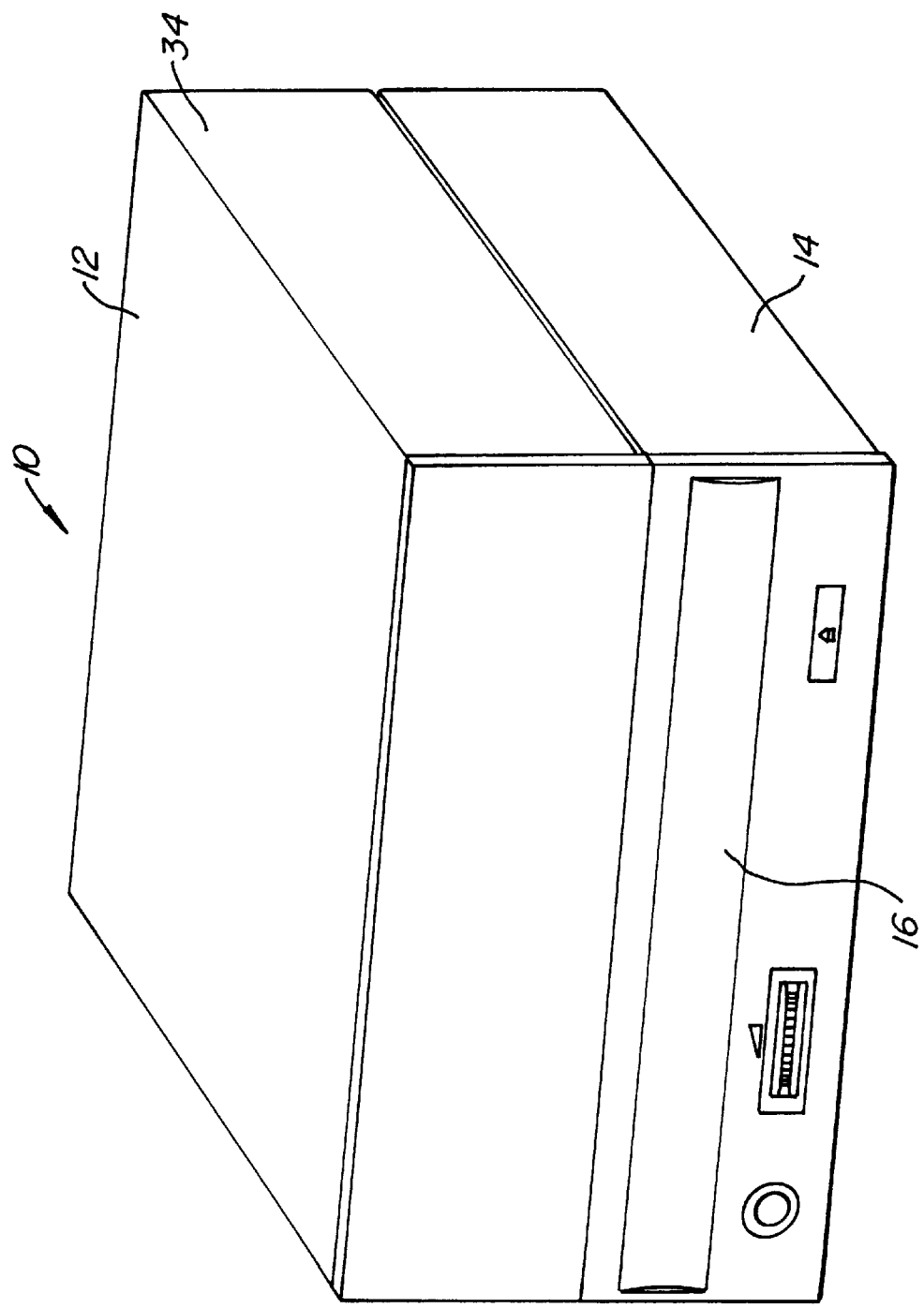
FIG. 1 is a perspective view of an exemplary labeling system that is integrated with an optical media recorder, according to the invention.

Referring now to FIG. 1, an exemplary embodiment of an integrated labeling system 10 will be described. System 10 comprises a label printer 12 which is integrated with a CD recorder 14. CD recorder 14 preferably comprises a commercially available CD recorder, such as those commercially available from Philips, Hewlett-Packard, and Sony. Further, although described in the context of a CD recorder, it will be appreciated that label printer 12 may be used with CD readers, other optical disk readers or recorders, and the like.

Figure 2:
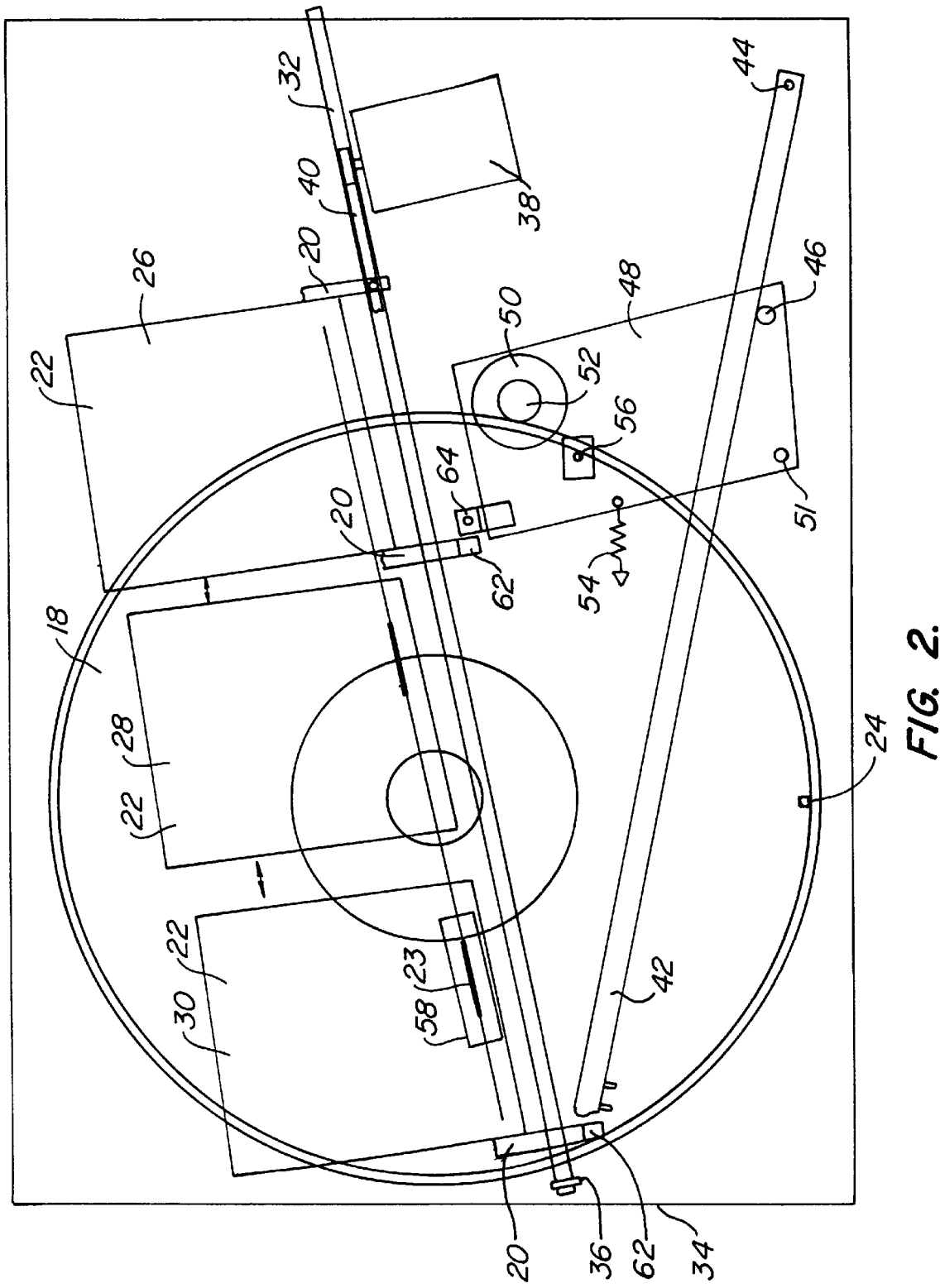
FIG. 2 is a cutaway top view of the system of FIG. 1.
Figure 3:
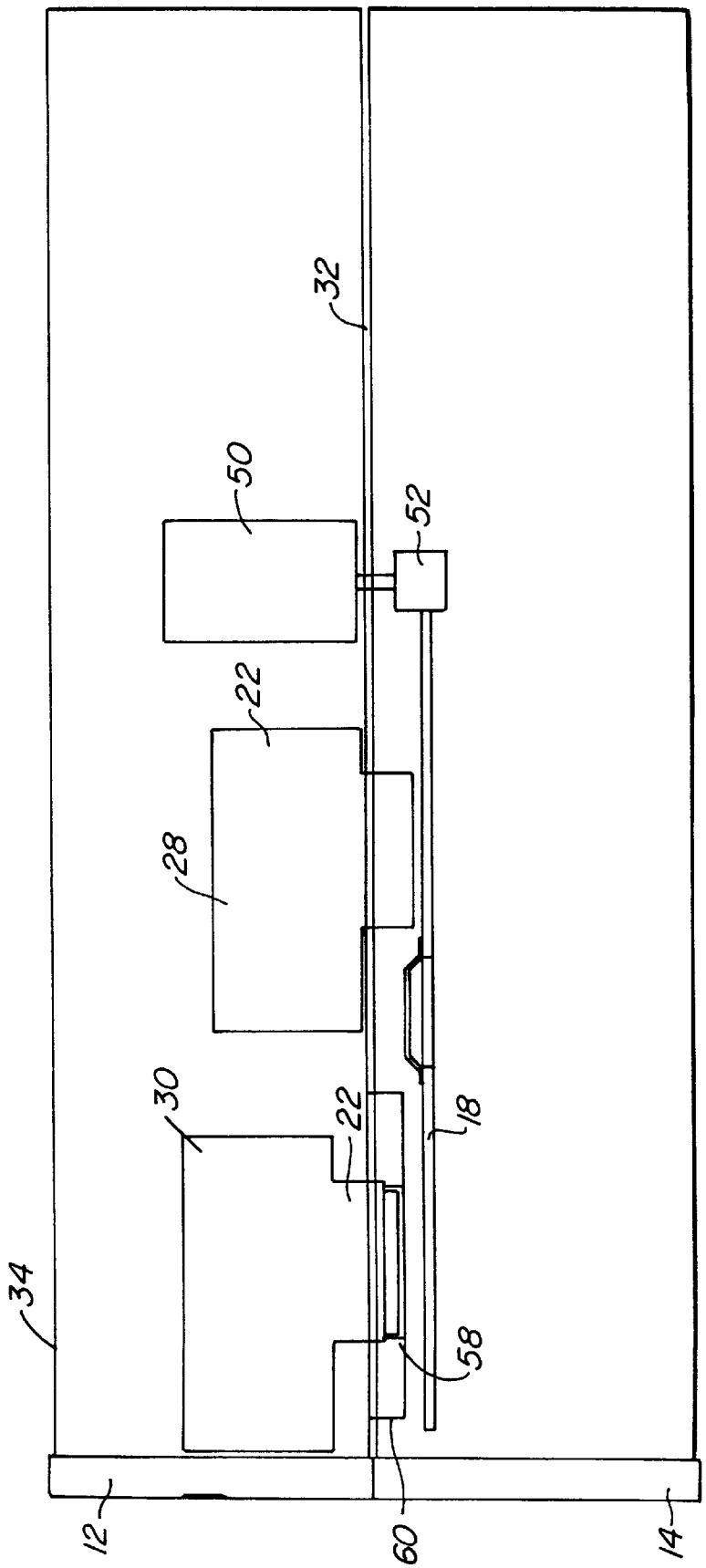
FIG. 3 is a cutaway side view of the system of FIG. 1 with selective elements being removed for convenience of the illustration.

CD-R 14 includes a pivotable door 16 into which the compact disk is inserted, typically on a tray (not shown), for a reading or recording session. As illustrated in FIGS. 2 and 3, the hardware of label printer 12 is disposed above a compact disk 18 when inserted into door 16.

Included within label printer 12 is a print carriage 20 holding a print head 22. Print head 22 includes a linear array of ink jets 23 which eject ink onto compact disk 18 to produce the label. Print head 22 may be configured to eject black or colored ink to produce black ink or colored ink labels. For example, print head 22 may be a Cannon BJ-10 (black) or a Cannon BJ-11 (black and three-color) print head. Further, a new Cannon BJ-11e print head features ink drop modulation for increased photographic level print quality and may optionally be used. Print head 22 is configured to be replaceable so that an old print head may be removed and discarded and replaced with a new print head. Further, print head 22 is easily accessible so that the ink cartridge may conveniently be replaced.

The label information to be printed is preferably delivered to print head 22 via a processor, such as a commercially available Pentium-type processors. A USB data interface is preferably used to couple the label printer 12 to a standard personal computer. Power to operate print head 22 is preferably 5 and 12 volts DC from a standard PC connector.

As illustrated in FIG. 1, label printer 12 preferably creates a full height internal unit when integrated with a recorder, reader, or used as a half height stand-alone printer as described in greater detail hereinafter. Label printer 12 is preferably configured to be retractable relative to CD recorder 14. In this way, label printer 12 may be retracted for cartridge or print head replacement.

Label printer 12 is preferably software driven. Conveniently, all label print software may be contained on one compact disk. The label print software may be compatible with Windows 95/98 and NT and will work in conjunction with Adaptec's CD-R software. The label print software preferably provides a variety of functions including: providing a template showing the outline of the label, providing for recording and reading functions on the compact disk, allowing for multiple label print sessions, providing label formatting and data sorting, i.e., performing a linear to polar data conversion and sequencing the data to send the data to the print head, including a print module driver having an ink usage monitor, providing a color printing option and providing operating instructions and help screens.

For convenience of discussion, operation of label printer 12 will be described generally in the context of a black and white model label printer. However, color versions may also be provided. The compact disk label may be designed with one of many software packages, such as MS Word, commercially available from Microsoft. A template defines the outline of the allowable image area that resides between an inner and outer circle of compact disk 18. When compact disk 18 is configured to be a conventional compact disk, the inner circle of the template preferably has a radius of 0.822 inch or 296 dots (at 360 dpi) and the outer circle has a radius of 2.244 inch, or 8.08 dots. The resulting width of the label band is 1.4422 inch or 512 dots. Such an exact number is chosen to cover the total label area of 128 dots width with four sweeps of a 128 jet print head.

With such a printable area, a field is reserved on the disk to enable features of the label printer. First, a label orientation mark 24 (of 32 by 32 dot dimension) is preferably printed just inside the outer image circle, with the rest of the 32-dot-wide band remaining blank. As described in greater detail hereinafter, mark 24 allows for the label to be oriented correctly for multiple label print sessions in conjunction with packet recording. Orientation mark 24 is also used in sensing the speed of the disk during the printing process as described in greater detail hereinafter.

The label information or label data that is employed to create the label on disk 18 is preferably recorded on compact disk 18 itself. In this way, the data is available when reinserting compact disk 18 for subsequent packet recording sessions as well as during disk duplication using an automatic label printer. Preferably, the label data will be in a standardized file format and location on compact disk 18.

When creating the label on the personal computer, the label data will typically be created in an x,y coordinate format. For example, the data may be stored in a matrix having 360 dots per inch (dpi). For maximum storage efficiency, the label data may be stored in a form of a graphics language like HPGL. To print on a rotating disk, the invention provides a method for converting the x,y coordinate format into a polar coordinate format. Such a conversion may take place inside label printer 12 or via software in the host computer.

To convert from the x,y coordinate format into a polar coordinate format, a single polar coordinate is determined for each x,y coordinate point. The x,y coordinate points are referenced from a coordinate center that is in the center of the label image. For the polar coordinates, the coordinate center is preferably at the center of the disk. In this way, the positive and negative x and y values will be 1/360 inch or 360 dpi for the x,y coordinate format. For the polar coordinates, the dot positions that the label printer can print are vector lengths in 1/360 inch increments and angles defined by 360° divided by the number of desired print sectors.

Hence, when converting to the polar coordinate format, more than one polar coordinate point may coincide with an x,y coordinate point, particularly for points located x closer toward the center of the disk. In such a case, the polar coordinate point that will be chosen is the point that is closest to the center of the corresponding x,y coordinate point. (A point, in this case, is intended to be the small area bordered halfway to adjacent points.)

When performing the conversion, the chosen number of sectors or angle increments, when divided by four, should result in a whole number in order to create four equal quadrants. As one example, 6936 sectors divided by four equals 1734, and will result in an average resolution of 720 dpi. Further, the number of sectors or angle increments will preferably be large enough to ensure that at least one polar coordinate point will match up with each x,y coordinate point. In this way, the conversion algorithm of the invention preserves the integrity of the original image in x,y coordinate form. In particular, the number of printed dots remains the same after the conversion. Therefore, the conversion does not corrupt gray scale or color shading of images.

Preferably, the conversion to polar coordinates is performed once at product design, using the chosen parameters. The result is documented in a "conversion table" that relates each x,y coordinate point to a printable polar coordinate point.

Label printer 12 is preferably used in connection with a printer software driver using the "conversion table" to convert the print data into printer compatible form. In this way, a polar coordinate point will represent the location where a dot may be printed (or where a dot may not be printed). The table is then filled with actual 0 or 1 values that describe the image and which defines which of the polar coordinate points must be printed as a dot in order to preserve the one-to-one relationship.

Once converted to polar coordinates, the data in the resulting file needs to be sorted further to create a bit stream which can be directly fed into the inkjet head. One exemplary sorting routine may be used when label printer 12 operates according to the following recording sequence. Initially, print head 22 is moved to an initial printing position 26 as illustrated in FIG. 2. In the initial printing position 26, the outside 128 tracks of compact disk 18, including orientation mark 24, may be printed. To print orientation mark 24, bits 1 to 32 are employed to print 32 sectors.

Following printing of a complete print band, i.e., an annular area, print carriage 20 is linearly translated along a radial line to a second position where the next adjacent band will be printed. The next adjacent band will employ bits 129 through 256. At each sector along the band, ink will be ejected until compact disk has completed one revolution. The remaining two print bands are completed in the same fashion, with carriage 20 being removed to a last print position 28 to complete the last band.

The above sorting routine may also be used to count the total number of true bits, and the number of dots recorded, which, accumulated in a 32-bit counter, monitor the ink supply. Ink supply status may be recorded and an appropriate warning produced when the supply of ink is low or expires.

The printer driver employed by the invention is preferably based on the USB channel which is preferably a low cost hardware implementation. Printer 12 operates using a Cypress USB microcontroller with 8KB EPROM, 256 Byte RAM, instant-on, and USB transceiver. If a 1 Mbps burst of 1.25 Mb length can be guaranteed from the printer driver, no additional RAM buffer is required in the print mode.

In one embodiment, the label creation, format conversion, data sorting and the printer USB-based driver can operate independently of the CD-R software. In this way, label printing may proceed as long as it does not interfere with CD-R recording. Consequently, one embodiment of the invention preferably employs a lockout feature between the two functions.

In another embodiment, if the label is defined when setting up the recording session, the label printing preferably occurs automatically after recording is finished. Further, the disk is preferably automatically ejected by a disk tray after printing.

Referring to FIGS. 2 and 3, when CD recorder 14 is not in recording mode, label printer 12 may be set into print mode. Initially, print carriage 20 is held in a home position 30. To begin printing, print carriage 20 is moved from home position 30 to initial printing position 26, as previously described, so that a first print band may be printed.

Print carriage 20 moves between its various positions by moving along a track 32 defined by a shaft. Track 32 is attached to a housing 34 of label printer 12 by a mount 36. In this way, carriage 20 may be moved over shaft to move print head 22 radially over compact disk 18. A print head motor 38 which is coupled to carriage 20 by a belt 40 is employed to translate carriage 20 over shaft. In this manner, motor 38 is employed to move print head 22 from home position 30, to initial print position 26 and then back to various printing positions over compact disk 18 so that the label may be printed.

When print head 22 is in home position 30, a lever 42 is also held in a home position by engagement with carriage 20. Lever 42 is pivotally attached at point 44 to housing 34. Lever 42 is in contact with a pin 46 on a mounting bracket 48 having a step motor 50. Mounting bracket 48 is pivotable about a pivot pin 51. Step motor 50 includes a capstan 52 that is employed to rotate compact disk 18 when capstan 52 engages the outer rim of compact disk 18 and step motor 50 is actuated. A spring 54 couples mounting bracket 48 to housing 34 and biases capstan 52 in the direction of compact disk 18. In this way, as print head 22 is moved from home position 30 toward initial printing position 26, carriage 20 releases lever 42 to allow spring 54 to pull mounting bracket 48 toward compact disk 18. In turn, capstan 52 is moved into engagement with the outer rim of compact disk 18. Step motor 50 may then be actuated to rotate capstan 52 and to rotate compact disk 18.

Hence, label printer 12 employs a separate motor to rotate compact disk 18 than the spindle motor (not shown) used to rotate compact disk 18 during a reading or recording session. An advantage of using step motor 50 is that it may rotate compact disk at a much lower rate of speed than is typically employed by a spindle motor in a reading or recording session.

As previously described, print head 22 is employed to print marker 24 on disk 18. Marker 24 is a 32 dot by 32 dot marker on tracks 1 through 32 of disk 18. One advantage of producing marker 24 directly on disk 18 is that the rate of rotation of disk 18 may be precisely determined. In particular, step motor 50 rotates capstan 52 at a nominal, clock-controlled speed. As disk 18 rotates, a counter measures the number of step pulses as gated by a position mark sensor 56 on mounting bracket 48 during a single revolution. The combination of step frequency and the number of steps per revolution is an accurate measure of disk speed or time per revolution. Based on this information, a correct sector recording clock may be computed by dividing the time for one revolution by the number of desired sectors. For example, 6936 sectors may be desired to produce a 720 dpi average resolution.

The master clock rate must be high enough to allow the digital print clock computation for one-half dot placement accuracy. The computed sector clock is then used to complete all data recording in a completely digital domain. All potential dot printing locations on disk 18 are under the control of the main clock from which the disk drive step clock, the computed sector clock and the print head step motor clock are derived. Hence, by printing in this manner, each annular print band may be formed with perfect closure, i.e., the ends of the print band will not overlap or be spaced apart. Further, such a method allows for accurate abutting of successive print bands along a radial axis as well as for matching of successive color overlays.

As just described, the printing of each band is synchronized by position marker 24. Each print band should be completed in one revolution to avoid unnecessary time delays. Hence, it is desirable to timely transfer the label information from the PC print driver or to provide additional RAM buffer in printer 12. Upon completion of printing of the first print band, print head 22 is moved by the equivalent of 128 dots toward the inside of disk 18 to cover the second print band. The disk rotation will preferably be stopped while the print head is moving to the new position, usually taking on the order of 100 to 200 milliseconds. Otherwise, a full disk revolution would be wasted. This process is repeated for print bands 3 and 4.

Following printing, print head 22 is moved to home position 30 where it rests on top of a rubber cap seal 58 to keep jets 23 from drying up. As best illustrated in FIG. 3, seal 58 is held within a cup 60 which holds seal 58 above the surface of disk 18.

For convenience of illustration, the spindle motor (and associated circuitry) used in CD recorder 14 has been omitted. However, it will be appreciated that compact disk 18 will rest upon the spindle motor. During a label printing session, capstan 52 is employed to rotate disk 18 about the axis of the spindle motor. When CD recorder 14 is operated, print head 22 is placed in home position 30 so that the elements mounted to mounting bracket 48 will not interfere with this operation.

As previously described, label printer 12 may be employed to print color labels on disk 18. In the color print mode, label printer 12 is operated as just described, except that more print bands is required. For example, the color print head may have 64 black jets and 24 jets for each of the three primary colors. All jets are in line with spaces between the four groups. Depending on what colors need to be printed on the 512 tracks, the heads will need to be positioned in many different locations. Hence, the head position is software controlled by the computer. A head position command is downloaded into label printer 12 ahead of the print data for each required head location.

As previously described, label printer 12 includes housing 34 into which the various components of the label printer are held. Housing 34 is also employed to position print head 22 accurately, with respect to the components of CD recorder 14. Housing 34 further facilitates the mounting of a printed circuit board with power and USB connectors that are accessible through cutouts in a rear panel of the housing. Housing 34 preferably contains openings for sliding in and out of print head 22 to allow replacement of ink cartridges and print heads. Hence, housing 34 provides print head 22 with the mechanical and electrical interfaces used to couple print head 22 with CD recorder 14 and the personal computer.

Label printer 12 may be coupled to a conventional CD recorder by removing the top panel of the CD recorder and the bracket assembly that holds the magnetic clamp disk. Depending on the particular model, other variations may be required to integrate label printer 12 with the CD recorder.

In one preferred embodiment, housing 34 includes a bottom panel with bent up sides and a rear. The sides accommodate the guide arrangement for sliding label printer 12 into the housing of printer 34. The bottom panel has cut outs for the lower extremities of print head 22, for the light path of position mark sensor 56, and for capstan 52. Mounted on the bottom of housing 34 is a new smaller magnetic clamp disk assembly (since the magnetic clamp disk assembly of the CD recorder was previously removed). Track 32, motor 38, seal 58 and mounting bracket 48 are also attached to housing 34.

As previously mentioned, print head 22 accepts standard Cannon BC-10 (black) or BC-11 (color) ink jet print heads, among others. Carriage 20 includes a simple snap-in arrangement to hold print head 22 in place. The various ink cartridges then plug into print head 22.

Track 32 preferably comprises a stainless steel shaft, and carriage 20 preferably slides on shaft by two widely-spaced plastic bearings. Shaft is positioned so that jets 23 are suspended approximately 1 mm above the surface of disk 18 and so that the line of travel of jets 23 intersects with a center of rotation disk 18. Shaft is preferably positioned so that one end, near the rear of housing 34, is angled 12 degrees counter-clockwise. Such an arrangement keeps jets 23 from passing directly over the CD recorder optics. A third sliding keeper is preferably provided on the far side of carriage 20 for supporting the carriage. A flat flexible multi-conductor cable preferably connects the print head to the printed circuit board.

As previously described, print head 22 is positioned by motor 38 which is preferably a step motor coupled to a pulley/tooth belt arrangement. Motor 38 can be microstepped so that carriage 20 can be moved in 720 steps per inch increments.

Carriage 20 includes a flag 62 that is used to determine the position of print head 22 relative to disk 18. More specifically, a print head sensor 64 is attached to mounting bracket 48 and senses flag 62 as print head 22 passes from home position 30 to initial printing position 26. Since print head sensor 64 is attached mounting bracket 48, when capstan 52 is employed to rotate disk 18, the distance from print head sensor 64 to the outer rim of disk 18 will be known. Hence, as flag 62 is sensed by sensor 64, the position of print head 22 relative to the outer rim of disk 18 may be determined. In this way, the radial position of jets 23 may be precisely controlled.

In summary, to begin printing, motor 38 begins moving carriage 20 from home position 30 and stops when flag 62 interrupts sensor 64. At the interruption point, print head 22 is preferably in the initial printing position 26. The sensor trigger point is preferably accurate with respect to disk 18. As previously described, such accuracy is obtained by mounting sensor 64 to bracket 48 so that the position of sensor 64 relative to the outer rim of disk 18 is known.

To clear the center hub of the compact disk and allow enough space for cup 60, print head 22 preferably raises 0.2 inch when arriving at home position 30. Raising of print head 22 is preferably accomplished by providing a ramp and mounting track 32 in mount 36 which is preferably slotted and spring loaded.

Position mark sensor 56 is configured to detect the edge of orientation mark 24 from an otherwise white background. As sensor 56 signals the beginning of a print band, the physical edge to electrical trigger point relationship is preferably configured to be repeatable within 0.3 dot, or approximately one mill. Such high repeatability is only required for the time it takes to complete all print bands. Position mark sensor 56 is also mounted to mounting bracket 48 to guarantee approximately one mill repeatability with respect to the edge of disk 18. Temperature and aging effects of the LED used in sensor 56 can presumably be ignored. However, the sensor and trigger circuit supply voltage should be well regulated and rippled-reduced to a few microvolts.

In one particular configuration, step motor 50 is preferably micro-stepped in 720 increments per inch. Preferably, drive motor 50 is a 15° step motor with 24 steps per revolution. By multiplying the number of steps per revolution by 24 micro-steps per step and by 1.25 revolutions, 720 steps per inch is obtained, with an approximately one quarter inch diameter capstan 52.

During disk recording, capstan 52 is removed from contacting disk 18. Such disengagement is accomplished by moving print head carriage 20 back to home position 30. As previously described, print head carriage 20 pushes against lever 42 to rotate mounting bracket 48 clockwise. Hence, whenever label printer 12 is inactive and print head is in home position 30, capstan 52 is disengaged from the edge of disk 18 and will not interfere with recording or reading operations. As described in greater detail hereinafter, lever 42 can be eliminated when label printer 12 is configured to be a stand-alone printer. To be physically compatible with future CD or DVD products, the clockwise rotation of mounting bracket 48 will preferably also lift a left side of mounting bracket 48 by sliding up a ramp (not shown). This lifts capstan 52 by approximately 0.2 inch and eliminates possible interference with existing or future CD carriages.

Label printer 12 is a low speed device when compared to computers and disk drives. Hence, one cypress USB control chip is provided to control all functions. Such a chip contains the USB transceiver, an 8-bit RISC processor, EPROM, RAM, watchdog timer, 12-bit timer, interrupt controller and up to 40 ports. The port's feature and internal Schmidt triggers to directly drive sensors 56 and 64. Step motors 38 and 50 are directly controlled by ICs (i.e., Mitsubishi M54673P). Sensors 56 and 64 interface directly with the USB chip. The print chip drive electronics use discrete devices (i.e., 16 banks of eight jets that are connected in parallel). One bank at a time is pulled down. This method allows the driving of 128 jets with only 24 signal lines, power, chassis ground and one head identification line for a total of 27 lines. Each jet may be fired at a maximum repetition rate of 6 kHz.

In summary, the printed circuit board (not shown) will contain a USB chip, a crystal clock and clock computation circuits, two ICs for step motor and drive circuits for the print head.

Print head 22 is preferably maintained under software control. This includes all movements to the print band positions, moving to the home position, movement associated with head cleaning procedures, and moving to an unloading or home position. For the ink jet drivers, software preferably provides the bit map for the vectors for one print band at a time (disregarding any data buffering for throughput), with only the timing for jet firing implemented in the electronic hardware.

Figure 4:
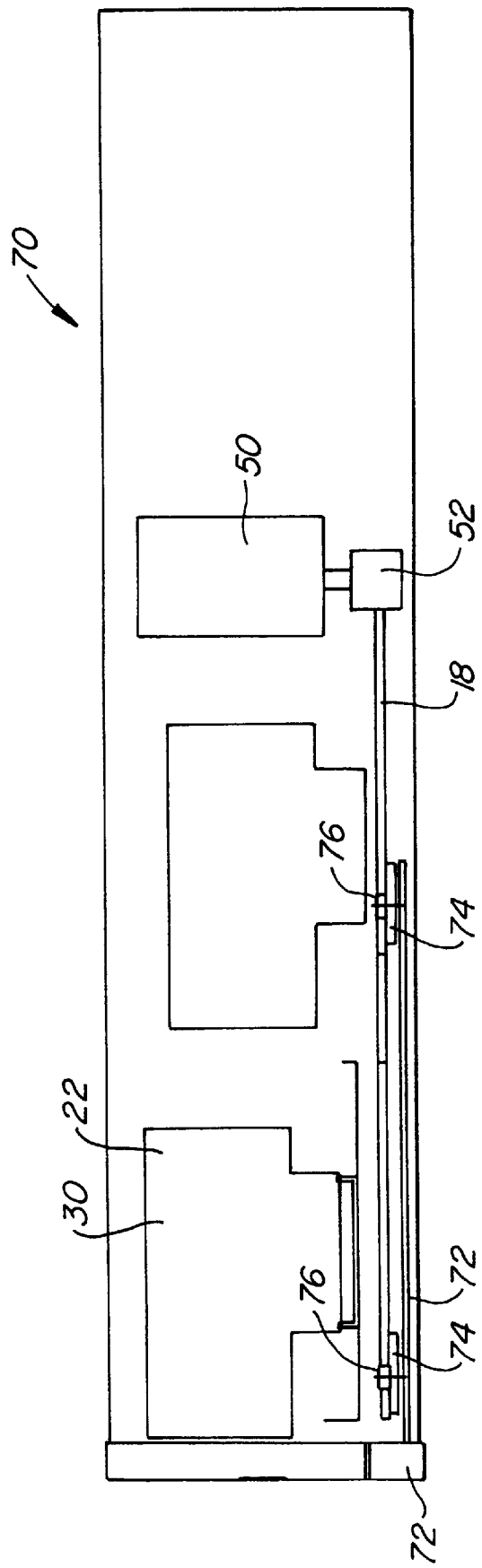
FIG. 4 is a cutaway side view of a stand-alone labeling system according to the invention.

Referring now to FIG. 4, a schematic illustration of a stand-alone label printer 70 will be described. Label printer 70 is similar to label printer 12 and, for convenience of discussion, will use the same reference numerals to describe elements which are identical to those used in connection with label printer 12. Since label printer 70 is configured to be a stand-alone printer, it does not include a lever for moving capstan 52 into engagement with the outer rim of disk 18. Instead, disk 18 is configured to engage capstan 52 when the disk 18 is placed into a carriage 72 which transports disk 18 into label printer 70 in a manner similar to the carriages used with conventional compact disk readers.

Carriage 72 includes three tapered wheels 74 (only two being shown). Disk 18 rests upon the tapered portion of wheels 74 and a projection 76 on each of the wheels 74 is positioned against the outer rim of disk 18. In this way, when capstan 52 engages disk 18, projections 76 will hold disk in contact with capstan 52. Further, when capstan 52 rotates disk 18, wheels 74 will also rotate to facilitate rotation of disk 18.

Hence, when disk 18 is inserted into label printer 70, motor 50 may be employed to rotate disk 18. Print head 22 is moved from home position 30 to an initial printing position so that a marker may be placed on disk 18 and so that the label may be printed on disk 18 in a manner similar to that previously described in connection with label printer 12.

The invention has now been described in some detail for purposes of clarity and understanding. However, it will be appreciated that certain changes and modifications may be made within the scope of the invention. Therefore, the above description should not be taken as limiting the scope of the invention. Instead, the scope of the invention should be determined with reference to the appended claims, along with the full scope of the equivalence to which those claims are entitled.

What is claimed is:

1. A system for transferring data to or from optical media, the system comprising:

a rotation mechanism disposed to rotate a circular optical medium;

a data transfer device to read data from or record data to the optical medium;

a track positioned above the rotation mechanism;

a print head operably attached to the track such that the print head may be moved along the track; and a controller disposed to send signals to rotate the rotation mechanism, to move the print head along the track, and to eject ink from the print head onto the medium while the rotation mechanism is rotating the medium, wherein:

the rotation mechanism comprises a motor coupled to a capstan, the capstan is adapted to be placed against an outer rim of the optical medium, and the capstan is operably attached to a pivotable mounting bracket, wherein a lever is operably attached to the mounting bracket such that movement of the print head toward a printing position operates the lever to move the capstan into engagement with the optical medium.

2. A system as in claim 1, wherein the data transfer device comprises a digital reader or recorder.

3. A label printing device for optical media, the device comprising:

a rotation mechanism disposed to rotate a circular optical medium;

a print head;

a track adapted to position the print head above the optical medium while the optical medium is rotating; and a mounting bracket interconnected to the rotation mechanism which is adapted to move the rotation mechanism into and out of engagement with the optical medium, wherein the mounting bracket is pivotally attached to a housing, and a lever is operably attached to the mounting bracket such that movement of the print head from a home position toward a printing position releases the lever to allow the capstan to move into engagement with the optical medium.

4. A device as in claim 3, wherein the rotation mechanism comprises a motor coupled to a capstan, wherein the capstan is adapted to be placed against an outer rim of the optical medium upon movement of the mounting bracket.

5. A system as in claim 4, further comprising a spring operably attached to the housing and the mounting bracket, wherein the spring pivots the capstan against the optical medium when the print head releases the lever.

6. A system as in claim 3, wherein the mounting bracket includes a position mark sensor which is adapted to detect a position mark on the optical medium as the optical medium rotates.

7. A system as in claim 3, wherein the mounting bracket includes a print head sensor to detect the location of the print head relative to the optical medium.

8. A method for printing labels on optical media, the method comprising steps of:

rotating an optical medium;

measuring a rate of rotation of the optical medium;

partitioning the optical medium into print sectors;

positioning a print head above the optical medium, the print head having a plurality of jets to eject ink onto the optical medium;

ejecting ink from selective ones of the jets while the optical medium is rotating, wherein the ink is ejected during time periods that are equal to a number of sectors divided by the a required to rotate the optical medium one revolution so that each time the ink is ejected an adjacent sector is printed.

9. A method as in claim 8, wherein the rate of rotation is measured by sensing a marker on the optical medium during rotation of the optical medium and counting the number of clock pulses produced when rotating the optical medium one revolution.

10. A method as in claim 8, further comprising printing the marker on the optical medium with the print head.

11. A method as in claim 9, further comprising printing a second label on the medium, wherein the second label is rotationally aligned with the first label by sensing the location of the marker and positioning the print head based on the location of the marker.

12. A method for printing labels on optical media, the method comprising:

rotating an optical medium having an outer periphery;

positioning a print head over the optical medium at an initial printing position which is known relative to the outer periphery; and ejecting ink from the print head while the optical medium is rotating and while the print head is at the printing position to create a label on the recording medium, wherein the positioning step comprising sensing a flag on the print head with a sensor whose location is known relative to the outer periphery.

13. A method as in claim 12, wherein the positioning step further comprising translating the print head along a track, and wherein the initial printing position is at a location along the track where the sensor initially senses the flag.

14. A method as in claim 13, wherein the sensor is disposed on a pivotable mounting bracket having a drive motor and a capstan such that the position of the sensor is fixed relative to the outer periphery when the capstan engages the outer periphery.

15. A method as in claim 12, further comprising printing a second label on the medium, wherein the radial location of the second label is determined after sensing the location of the flag on the print head.

16. A label printing device for optical media, the device comprising:

a rotation mechanism disposed to rotate a circular optical medium;

a print head;

a track adapted to position the print head above the optical medium while the optical medium is rotating; and a mounting bracket which is adapted to move the rotation mechanism into and out of engagement with the optical medium, wherein the mounting bracket includes a position mark sensor which is adapted to detect a position mark on the optical medium as the optical medium rotates.

17. A label printing device for optical media, the device comprising:

a rotation mechanism disposed to rotate a circular optical medium;

a print head;

a track adapted to position the print head above the optical medium while the optical medium is rotating; and a mounting bracket which is adapted to move the rotation mechanism into and out of engagement with the optical medium, wherein the mounting bracket includes a print head sensor to detect the location of the print head relative to the optical medium.

* * * * *

UNITED STATES PATENT AND TRADEMARK OFFICE
CERTIFICATE OF CORRECTION

PATENT NO. : 6,074,031  
APPLICATION NO. : 08/988843  
DATED : June 13, 2000  
INVENTOR(S) : Rolf D. Kahle Page 1 of 1

It is certified that error appears in the above-identified patent and that said Letters Patent is hereby corrected as shown below:

In column 13, line 4 of claim 8, please delete "the" and insert --time-- after the article "a".

Signed and Sealed this

Fifteenth Day of May, 2007

JON W. DUDAS  
*Director of the United States Patent and Trademark Office*